United States Patent
Nory et al.

(10) Patent No.: US 10,694,475 B2
(45) Date of Patent: Jun. 23, 2020

(54) CONFIGURING DUAL CONNECTIVITY MAXIMUM TRANSMIT POWER

(71) Applicant: Telefonaktiebolaget LM Ericsson (publ), Stockholm (SE)

(72) Inventors: Ravikiran Nory, Buffalo Grove, IL (US); Christian Bergljung, Lund (SE); Daniel Larsson, Lund (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/204,286

(22) Filed: Nov. 29, 2018

(65) Prior Publication Data

US 2019/0174433 A1    Jun. 6, 2019

Related U.S. Application Data

(60) Provisional application No. 62/593,477, filed on Dec. 1, 2017.

(51) Int. Cl.
*H04W 52/36* (2009.01)
*H04W 52/14* (2009.01)
(Continued)

(52) U.S. Cl.
CPC ...... *H04W 52/367* (2013.01); *G06F 9/45558* (2013.01); *H04L 5/0048* (2013.01);
(Continued)

(58) Field of Classification Search
None
See application file for complete search history.

(56) References Cited

U.S. PATENT DOCUMENTS

2011/0081936 A1*  4/2011  Haim ............... H04W 52/367
                                                      455/522
2015/0201383 A1*  7/2015  Papasakellariou .. H04W 52/367
                                                      370/278
(Continued)

FOREIGN PATENT DOCUMENTS

WO    WO-2014104961 A2 *  7/2014  ............ H04B 17/27
WO    2017/0135573 A1     8/2017

OTHER PUBLICATIONS

3GPP TSG RAN WG1 Meeting #90; Prague, Czechia; Source: ZTE; Title: Offline summary for AI 6.1.7 NR UL power control (R1-1715190); Aug. 21-25, 2017.
(Continued)

*Primary Examiner* — Mohammed Rachedine
(74) *Attorney, Agent, or Firm* — Baker Botts, LLP

(57) ABSTRACT

A method is performed by a wireless device. The method comprises determining a first configured maximum transmit power value (P_cmax1) for transmitting in a first radio access technology (RAT). The P_cmax1 is determined based on one or more transmissions of the first RAT. The method further comprises determining a second configured maximum transmit power value (P_cmax2) for transmitting in a second RAT. The P_cmax2 is determined based on transmissions of both the first RAT and the second RAT. The method further comprises performing a transmission in the first RAT at a power less than or equal to the P_cmax1. The method further comprises performing a transmission in the second RAT at a power less than or equal to the P_cmax2.

28 Claims, 10 Drawing Sheets

(51) Int. Cl.
    *H04W 74/08*     (2009.01)
    *H04W 76/15*     (2018.01)
    *H04L 25/02*     (2006.01)
    *H04L 5/00*     (2006.01)
    *G06F 9/455*     (2018.01)

(52) U.S. Cl.
    CPC ....... *H04L 25/0226* (2013.01); *H04W 52/146* (2013.01); *H04W 74/0833* (2013.01); *H04W 76/15* (2018.02); *G06F 2009/45595* (2013.01)

(56) References Cited

U.S. PATENT DOCUMENTS

2016/0353440 A1* 12/2016 Lee .................. H04W 72/0453
2018/0092007 A1* 3/2018 Ekici .................. H04W 52/245

OTHER PUBLICATIONS

3GPP TSG-RAN WG1 NR Ad-hoc#2; Qingdao, China; Source: Ericsson; Title: Power Sharing for LTE-NR Dual connectivity (R1-1711526); Jun. 27-30, 2017.
PCT International Search Report for International application No. PCT/IB2018/059469 dated Mar. 6, 2019.

\* cited by examiner

CONFIGURING DUAL CONNECTIVITY MAXIMUM TRANSMIT POWER

RELATED APPLICATIONS

This application claims the benefit of Provisional Application Ser. No. 62/593,477, filed on Dec. 1, 2017 and entitled "Configured Maximum Transmit Power Determination for LTE-NR Dual Connectivity," the contents of which are incorporated by reference herein in their entirety.

TECHNICAL FIELD

Certain embodiments of the present disclosure relate, in general, to wireless communications and, more particularly, to managing transmission powers for wireless communications.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

When a wireless device (such as user equipment (UE)) transmits physicals channels (such as Physical Uplink Shared Channel (PUSCH), Physical Uplink Control Channel (PUCCH), or Physical Random Access Channel) or signals (such as Sounding Reference Signals (SRS)), the maximum power level at which the UE makes those transmissions is generally bounded by a configured maximum transmit power (Pcmax) value.

For UE transmissions corresponding to multiple component carriers or serving cells (e.g., c1, c2, c3) in a carrier aggregation scenario, UE transmissions corresponding to each serving cell are bounded by a respective per serving cell configured maximum transmit power value Pcmax,c (where c=c1, c2, c3), and the cumulative power of the transmissions across all the serving cells is bounded by a total configured maximum output power P_cmax. Pcmax,c used by the UE needs to be within a particular range with the higher bound typically determined by the Power class declared (Ppowerclass) by the UE and any higher layer (e.g., Radio Resource Control (RRC)) configured power limits (P_emax,c), and the lower bound based on P_powerclass, p-emax, and maximum values of any power reductions that the UE can apply.

For example, UE transmissions corresponding to serving cell c are bounded by PCMAX,c that needs be in the following range shown below.

$P_{CMAX\_L,c} \leq P_{CMAX,c} \leq P_{CMAX\_H,c}$ with $P_{CMAX\_L,c} = \text{MIN}\{P_{EMAX,c}, P_{PowerClass} - \text{MAX}(X\text{-}MPR,c))\}$ $P_{CMAX\_H,c} = \text{MIN}\{P_{EMAX,c}, P_{PowerClass}\}$ where $P_{CMAX\_H,c}$ is the higher bound on $P_{CMAX,c}$
$P_{CMAX\_L,c}$ is the lower bound on $P_{CMAX,c}$
$P_{EMAX,c}$ is a higher layer (e.g., RRC) configured power limit
$P_{powerclass}$ is the UE power class and is a maximum UE power value that is present in specifications;
X-MPR,c is the sum of maximum values of power reductions that the UE is allowed to take
and the above values are in dB scale For the case where UE has transmissions corresponding to multiple component carriers or serving cells, the total configured maximum output power PCMAX1 needs to be within the following bounds:

$P_{CMAX\_L} \leq P_{CMAX} \leq P_{CMAX\_H}$ $P_{CMAX\_L} = \text{MIN}\{10 \log_{10} \Sigma \text{MIN}[p_{EMAX,c}, p_{PowerClass}/(x\text{-}mpr,c)], P_{PowerClass}\}$ $P_{CMAX\_H} = \text{MIN}\{10 \log_{10} \Sigma p_{EMAX,c}, P_{PowerClass}\}$ where $p_{EMAX,c}$ is the linear value of $P_{EMAX,c}$;
$P_{PowerClass}$ is the UE power class and is a maximum UE power value that is present in specifications;
$p_{PowerClass}$ is the linear value of $P_{PowerClass}$;
x-mpr,c is the linear value of X-MPR,c described above for each serving cell c;
and the summation ($\Sigma(\ )$) shown above is applied across all the serving cell (e.g. c1,c2,c3) on which the UE has transmissions.

There currently exist certain challenges. In some cases, the UE may be required to perform transmissions corresponding to different radio access technologies (RATs). For example, the UE can be scheduled such that it needs to transmit simultaneously or overlapping with a transmission corresponding to a first serving cell c1 associated with a long-term evolution (LTE) RAT and a second serving cell c2 associated with new radio (NR) RAT. A suitable mechanism for determining configured maximum transmit power value (s) that takes into account UE implementation complexity for such scenarios is needed (e.g., the UE operation on LTE RAT may not be aware of NR side transmission parameters/setting, which could result in undesirable effects).

Certain aspects of the present disclosure and their embodiments may provide solutions to these or other challenges.

SUMMARY

According to an embodiment, a method is performed by a wireless device. The method comprises determining a first configured maximum transmit power value (P_cmax1) for transmitting in a first radio access technology (RAT). The P_cmax1 is determined based on one or more transmissions of the first RAT. The method further comprises determining a second configured maximum transmit power value (P_cmax2) for transmitting in a second RAT. The P_cmax2 is determined based transmissions of both the first RAT and the second RAT. The method further comprises performing a transmission in the first RAT at a power less than or equal to P_cmax1. The method further comprises performing a transmission in the second RAT at a power less than or equal to P_cmax2.

According to another embodiment, a wireless device is provided. The wireless device comprises a memory configured to store instructions. The wireless device also comprises processing circuitry configured to execute the instructions. The wireless device is configured to determine a first configured maximum transmit power value (P_cmax1) for transmitting in a first radio access technology (RAT). The P_cmax1 is determined based on one or more transmissions of the first RAT. The wireless device is further configured to determine a second configured maximum transmit power value (P_cmax2) for transmitting in a second RAT. The P_cmax2 is determined based on transmissions of both the first RAT and the second RAT. The wireless device is further configured to perform a transmission in the first RAT at a power less than or equal to P_cmax1. The wireless device is further configured to perform a transmission in the second RAT at a power less than or equal to P_cmax2.

According to yet another embodiment, a computer program product comprises a non-transitory computer readable medium storing computer readable program code. the computer readable program code comprises program code for determining a first configured maximum transmit power value (P_cmax1) for transmitting in a first radio access technology (RAT). The P_cmax1 is determined based on one or more transmissions of the first RAT. The computer readable program code further comprises program code for determining a second configured maximum transmit power value (P_cmax2) for transmitting in a second RAT. The P_cmax2 is determined based on transmissions of both the first RAT and the second RAT.

The computer readable program code further comprises program code for performing a transmission in the first RAT at a power less than or equal to P_cmax1. The computer readable program code further comprises program code for performing a transmission in the second RAT at a power less than or equal to P_cmax2. In certain embodiments, the method/wireless device/computer program product may provide one or more of the additional features provided below:

In particular embodiments, the P_cmax1 is further based on at least a first maximum power reduction value (MPR1). The MPR1 is determined based on a number of resource blocks allocated for the one or more transmissions of the first RAT. In some embodiments, the MPR1 is determined based on the number of resource blocks allocated for transmissions of only the first RAT.

In particular embodiments, the P_cmax2 is further based on at least a second maximum power reduction value (MPR2). The MPR2 is determined based on a number of resource blocks allocated for the transmissions of both the first RAT and the second RAT.

In particular embodiments, the P_cmax2 is determined based at least in part on a transmission power of current transmissions on the first RAT.

In particular embodiments, determining the P_cmax1 comprises determining a lower bound and an upper bound for the P_cmax1 and using a value within the lower bound and the upper bound as the value of the P_cmax1.

In particular embodiments, determining the P_cmax2 comprises determining a lower bound and an upper bound for the P_cmax2 and using a value within the lower bound and the upper bound as the value of the P_cmax2.

In particular embodiments, performing the transmission in the first RAT comprises transmitting a physical channel or signal of the first RAT. The physical channel or signal of the first RAT is one of a Physical Uplink Shared Channel (PUSCH), a Physical Uplink Control Channel (PUCCH), a Sounding Reference Signal (SRS), and a Physical Random Access Channel (PRACH). Performing the transmission in the second RAT comprises transmitting a physical channel or signal of the second RAT. The physical channel or signal of the second RAT is one of a PUSCH, a PUCCH, a PRACH, and an SRS.

In particular embodiments, the first RAT is a Long term evolution (LTE) RAT and the second RAT is a New Radio (NR) RAT.

In particular embodiments, the P_cmax1 is determined based on one or more of the following: a power class value that the wireless device indicates to the network as part of wireless device capability signaling (P_powerclass), a maximum allowed power value for the first radio access technology (P_RAT1), a first maximum power reduction value (MPR1), and/or a first backoff value (BO1).

In particular embodiments, the P_cmax2 is determined based on one or more of the following: the P_powerclass, a maximum allowed power value for the second radio access technology (P_RAT2), a second maximum power reduction value (MPR2), a second backoff value (BO2), the P_cmax1, the MPR1, and/or the BO1.

In particular embodiments, the P_cmax1 is determined based at least in part on the MPR1 and/or the BO1. The MPR1 and/or the BO1 are determined by the wireless device based on the second RAT having no scheduled transmissions regardless of whether the wireless device is scheduled to transmit on the RAT.

In particular embodiments, the P_cmax2 is determined based at least in part on the MPR2 and/or the BO2. The MPR2 and/or the BO2 are determined by the wireless device by considering transmissions scheduled for both the first RAT and the second RAT.

In particular embodiments, the P_cmax2 is determined based at least in part on: at least one of the MPR2 and/or the BO2 and at least one of the MPR1, the BO1, and/or the P_cmax1. The MPR2 and/or the BO2 are determined by the wireless device based on the first RAT having no scheduled transmissions regardless of whether the wireless device is scheduled to transmit on the first RAT.

In particular embodiments, the P_cmax2 is lower than the P_RAT2 and the P_cmax2 is lower than the P_cmax1.

In particular embodiments, the powers of the transmission performed in the first radio access technology and the transmission performed in the second RAT are both bounded based on the P_cmax2.

In particular embodiments, the MPR1 is further based on positions of resource blocks allocated for the one or more transmissions of the first RAT. In some embodiments, the MPR1 is further based on positions of resource blocks allocated for transmissions of only the first RAT.

In particular embodiments, the MPR2 is further based on positions of resource blocks allocated for the transmissions of the second RAT and the first RAT.

In particular embodiments, the MPR2 is based on a number and/or position of resource blocks allocated for transmissions of the second RAT. The P_cmax2 is determined based at least in part on the MPR2.

In particular embodiments, the transmissions of the second RAT are not used in determining P_cmax1. For example, the P_cmax1 is determined based on transmissions of only the first RAT.

According to an embodiment, a method is performed by a network node. The method comprises determining a configuration for an indicator. The indicator indicates whether, when a wireless device is determining a first configured maximum transmit power value (P_cmax1) for a first radio access technology (RAT), the wireless device is to consider transmissions scheduled for both the first RAT and a second RAT. The method further comprises sending the indicator to the wireless device.

According to another embodiment, a network node is provided. The network node comprises a memory configured to store instructions. The network node further comprises processing circuitry configured to execute the instructions. The network node is configured to determine a configuration for an indicator. The indicator indicates whether, when a wireless device is determining a first configured maximum transmit power value (P_cmax1) for a first radio access technology (RAT), the wireless device is to consider transmissions scheduled for both the first RAT and a second RAT. The network node is further configured to send the indicator to the wireless device.

According to yet another embodiment, a computer program product comprises a non-transitory computer readable medium storing computer readable program code. The computer readable program code comprises program code for determining a configuration for an indicator. The indicator indicates whether, when a wireless device is determining a first configured maximum transmit power value (P_cmax1) for a first radio access technology (RAT), the wireless device is to consider transmissions scheduled for both the first RAT and a second RAT. The computer readable program code further comprises program code for sending the indicator to the wireless device.

In particular embodiments, the method/network node/computer program product further comprises sending information to the wireless device from which the wireless derives the P_cmax1 for transmitting in the first RAT and a second configured maximum transmit power value (P_cmax2) for transmitting in the second RAT.

Certain embodiments of the present disclosure may provide one or more technical advantages. For example, certain embodiments allow the determination of configured maximum transmit power values for LTE-NR dual connectivity (DC) operation. For example, certain embodiments allow the determination of a first configured maximum transmit power value applicable to LTE transmissions and a second configured maximum transmit power value applicable for both LTE and NR transmissions. Transmissions may be configured using the first and second configured maximum transmit power values. As another example, certain embodiments allow a simpler UE implementation where LTE-side UE hardware/software can operate independently without considering NR side transmissions or hardware/software settings. As yet another example, certain embodiments allow NR-side UE hardware/software to consider LTE side transmissions or hardware/software settings, which may help to reduce interference in certain scenarios.

Certain embodiments may have none, some, or all of the above-recited advantages. Other advantages may be readily apparent to one having skill in the art.

BRIEF DESCRIPTION OF THE DRAWINGS

For a more complete understanding of the disclosed embodiments and their features and advantages, reference is now made to the following description, taking in conjunction with the accompanying drawings, in which.

DETAILED DESCRIPTION

Figure 1:
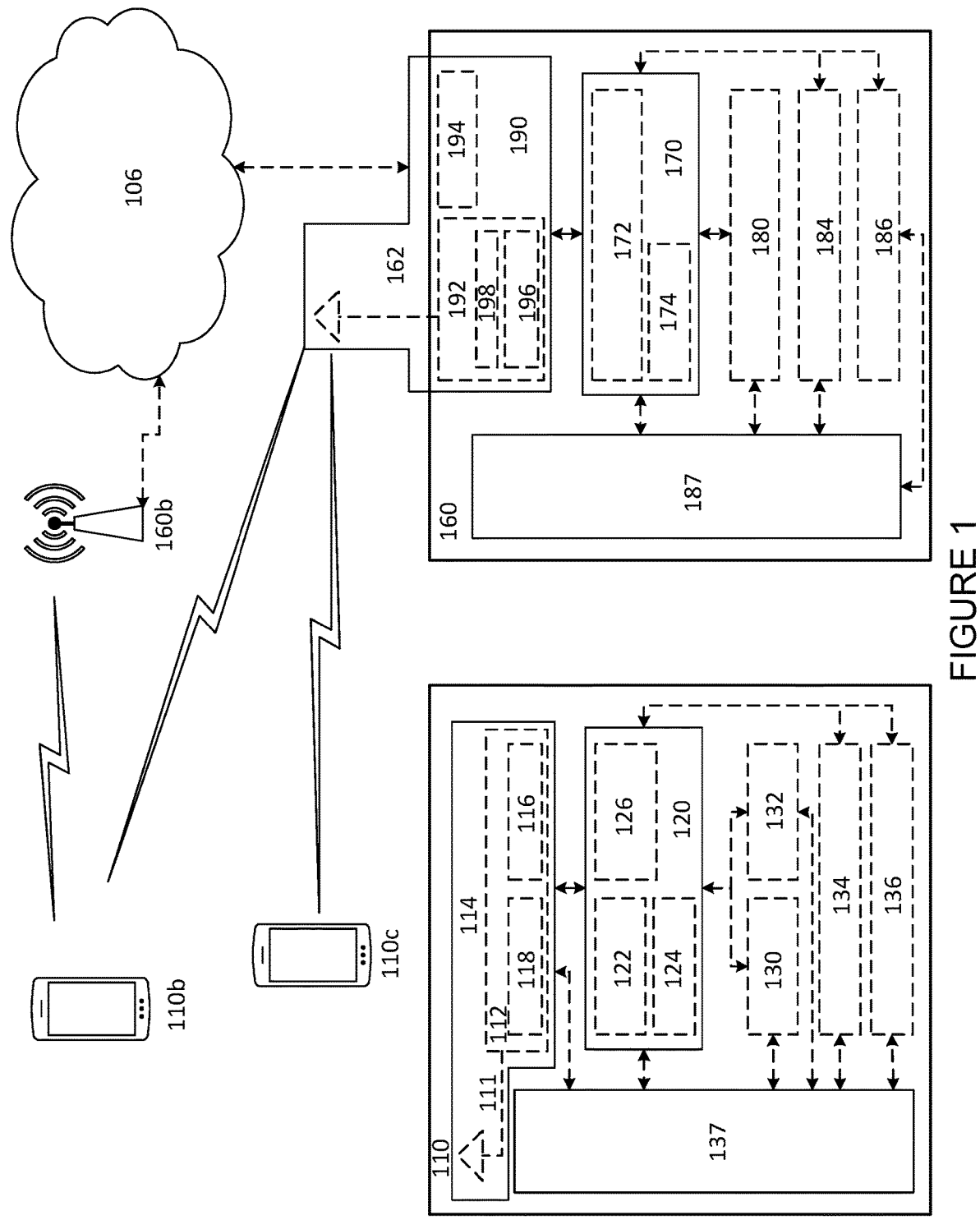
FIG. 1 illustrates an example wireless network, in accordance with certain embodiments.

Some of the embodiments contemplated herein will now be described more fully with reference to the accompanying drawings. Other embodiments, however, are contained within the scope of the subject matter disclosed herein. The disclosed subject matter should not be construed as limited to only the embodiments set forth herein. Rather, these embodiments are provided by way of example to convey the scope of the subject matter to those skilled in the art.

The teachings herein provide mechanisms for determining configured maximum transmit power values for a LTE-NR dual connectivity (DC) operation. In certain embodiments, the UE determines a first configured maximum transmit power value (P_cmax1) applicable to LTE transmissions and a second configured maximum transmit power value applicable for both LTE and NR transmissions. According to certain embodiments, a UE configured with LTE-NR DC determines a first configured maximum transmit power value (P_cmax1) applicable to LTE transmissions by considering only LTE transmissions and a second configured maximum transmit power value (P_cmax2) by considering both LTE and NR transmissions. The UE transmits physical channels or signals (e.g., PUSCH/PUCCH/SRS) corresponding to LTE RAT such that their transmission power is smaller than P_cmax1. The UE transmits physical channels or signals (e.g., PUSCH/PUCCH/SRS) corresponding to NR RAT such that their transmission power is smaller than P_cmax2.

In certain embodiments, the wireless device (e.g., a UE) transmits physical channel(s)/signal(s) corresponding to a first RAT. The wireless device also transmits physical channel(s)/signal(s) corresponding to a second RAT. The transmit power of the physical channel(s)/signal(s) transmitted by the wireless device for the first RAT is bounded by a first configured maximum transmit power value (P_cmax1). The transmit power of the physical channel(s)/signal(s) transmitted by the wireless device for at least the second RAT is bounded by a second configured maximum transmit power value (P_cmax2).

In certain embodiments, the wireless device may determine P_cmax1 using at least the following:
  A power class value that the wireless device indicates to the network as part of wireless device capability signaling (P_powerclass)
  A maximum allowed power value for the first RAT (P_RAT1)
  At least one of:
    a first maximum power reduction value (MPR1)
    a first backoff value (BO1)

In certain embodiments, the wireless device may determine P_cmax2 using at least the following:
  P_powerclass
  A maximum allowed power value for the second RAT (P_RAT2)
  At least one of:
    a second maximum power reduction value (MPR2)
    a second backoff value (BO2)
    P_cmax1
    MPR1
    BO1

In some embodiments, MPR1 and/or BO1 may be determined by the wireless device as if there is no transmission on the second RAT regardless of whether the wireless device is scheduled to transmit on the second RAT. For example, if the wireless device is scheduled to transmit on the first RAT in a first time duration (e.g., in a subframe/slot x) the wireless device may determine MPR1 and/or BO1 as if there is no transmission on the second RAT even if the wireless device is scheduled to transmit on the second RAT in a time duration that overlaps the first time duration.

In certain embodiments, P_cmax2, MPR2 and/or BO2 may be determined by the wireless device by considering transmissions scheduled for both the first RAT and the second RAT.

In some embodiments, MPR2 and/or BO2 may be determined by the wireless device assuming there is no transmission on the first RAT regardless of whether the wireless device is scheduled to transmit on the first RAT. The wireless device may still use one of MPR1, BO1, P_cmax1 to determine P_cmax2.

In some embodiments, the wireless device may use the transmission power of ongoing transmission(s) on the first RAT to determine P_cmax2.

In some embodiments, the wireless device can determine P_cmax2 such that it is lower than min(P_RAT2,P_cmax1), where min( ) gives the minimum value of the respective values.

In certain embodiments, the first RAT may be LTE and the second RAT maybe NR.

In certain embodiments, determining P_cmax1 can comprise determining a lower bound and/or an upper bound for P_cmax1 and using a value for P_cmax1 that is within these bounds.

In certain embodiments, determining P_cmax2 can comprise determining a lower bound and/or an upper bound for P_cmax2 and using a value for P_cmax2 that is within these bounds.

In some embodiments, the transmit power of the physical channel(s)/signal(s) transmitted by the wireless device for both the first RAT and second RAT can be bounded by the second configured maximum transmit power value (P_cmax2).

In certain embodiments, the physical channel(s)/signal(s) transmitted by the wireless device can be one or more of a Physical Uplink Shared Channel (PUSCH), a Physical Uplink Control Channel (PUCCH), a Sounding Reference Signal (SRS), and a Physical Random Access Channel (PRACH).

In certain embodiments, MPR1 can be based on number and/or position of resource blocks allocated for transmissions corresponding to LTE RAT.

In certain embodiments, MPR2 can be based on number and/or position of resource blocks allocated for transmissions corresponding to the NR RAT and the LTE RAT. In certain embodiments, MPR2 can be based on number and/or position of resource blocks allocated for transmissions corresponding to only the NR RAT.

Accordingly, a wireless device may flexibly determine the configured maximum transmit power values for transmitting over multiple radio access technologies (such as in dual connectivity with a NR RAT and LTE RAT).

Although the subject matter described herein may be implemented in any appropriate type of system using any suitable components, the embodiments disclosed herein are described in relation to a wireless network, such as the example wireless network illustrated in FIG. 1. For simplicity, the wireless network of FIG. 1 only depicts network 106, network nodes 160 and 160b, and WDs 110, 110b, and 110c. In practice, a wireless network may further include any additional elements suitable to support communication between wireless devices or between a wireless device and another communication device, such as a landline telephone, a service provider, or any other network node or end device. Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together in order to provide network node and/or wireless device functionality, such as providing wireless connections in a wireless network.

In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 1, network node 160 includes processing circuitry 170, device readable medium 180, interface 190, auxiliary equipment 184, power source 186, power circuitry 187, and antenna 162. Although network node 160 illustrated in the example wireless network of FIG. 1 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160, but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 1 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120, and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those particular embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110 as a whole, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into WD 110, and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network, and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry. Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Figure 2:
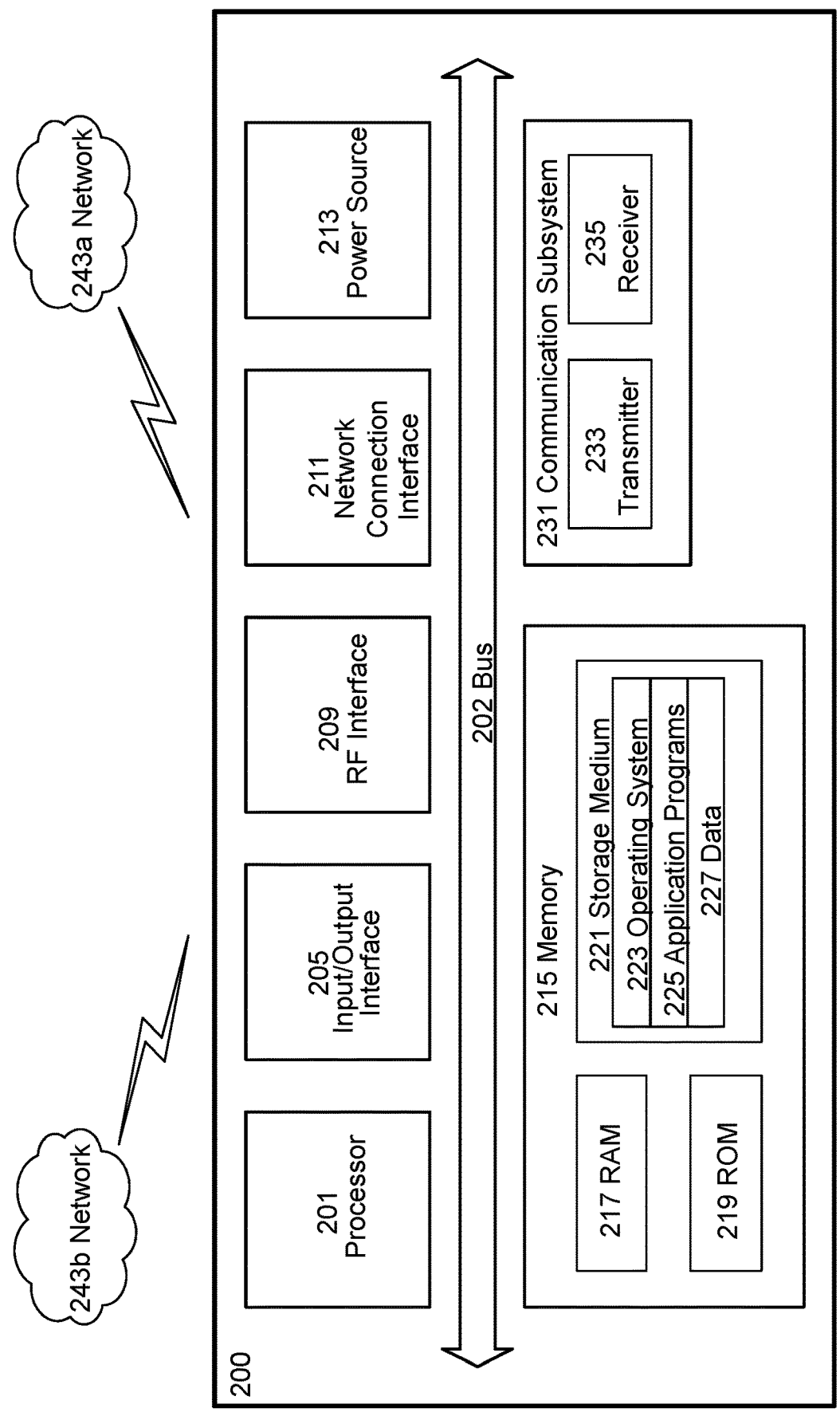
FIG. 2 illustrates an example user equipment, in accordance with certain embodiments.

FIG. 2 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 2200 may be any UE identified by the $3^{rd}$ Generation Partnership Project (3GPP), including a NB-IoT UE, a machine type communication (MTC) UE, and/or an enhanced MTC (eMTC) UE. UE 200, as illustrated in FIG. 2, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 2 is a UE, the components discussed herein are equally applicable to a WD, and vice-versa.

In FIG. 2, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may utilize all of the components shown in FIG. 2, or only a subset of the components. The level of integration between the components may vary from one UE to another UE. Further, certain UEs may contain multiple instances of a component, such as multiple processors, memories, transceivers, transmitters, receivers, etc.

In FIG. 2, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205. An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof. UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 2, RF interface 209 may be configured to provide a communication interface to RF components such as a transmitter, a receiver, and an antenna. Network connection interface 211 may be configured to provide a communication interface to network 243a. Network 243a may encompass wired and/or wireless networks such as a local-area network (LAN), a wide-area network (WAN), a computer network, a wireless network, a telecommunications network, another like network or any combination thereof. For example, network 243a may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory. Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 2, processing circuitry 201 may be configured to communicate with network 243b using communication subsystem 231. Network 243a and network 243b may be the same network or networks or different network or networks. Communication subsystem 231 may be configured to include one or more transceivers used to communicate with network 243b. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243b may encompass wired and/or wireless networks such as a local-area network (LAN), a wide-area network (WAN), a computer network, a wireless network, a telecommunications network, another like network or any combination thereof. For example, network 243b may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 3:
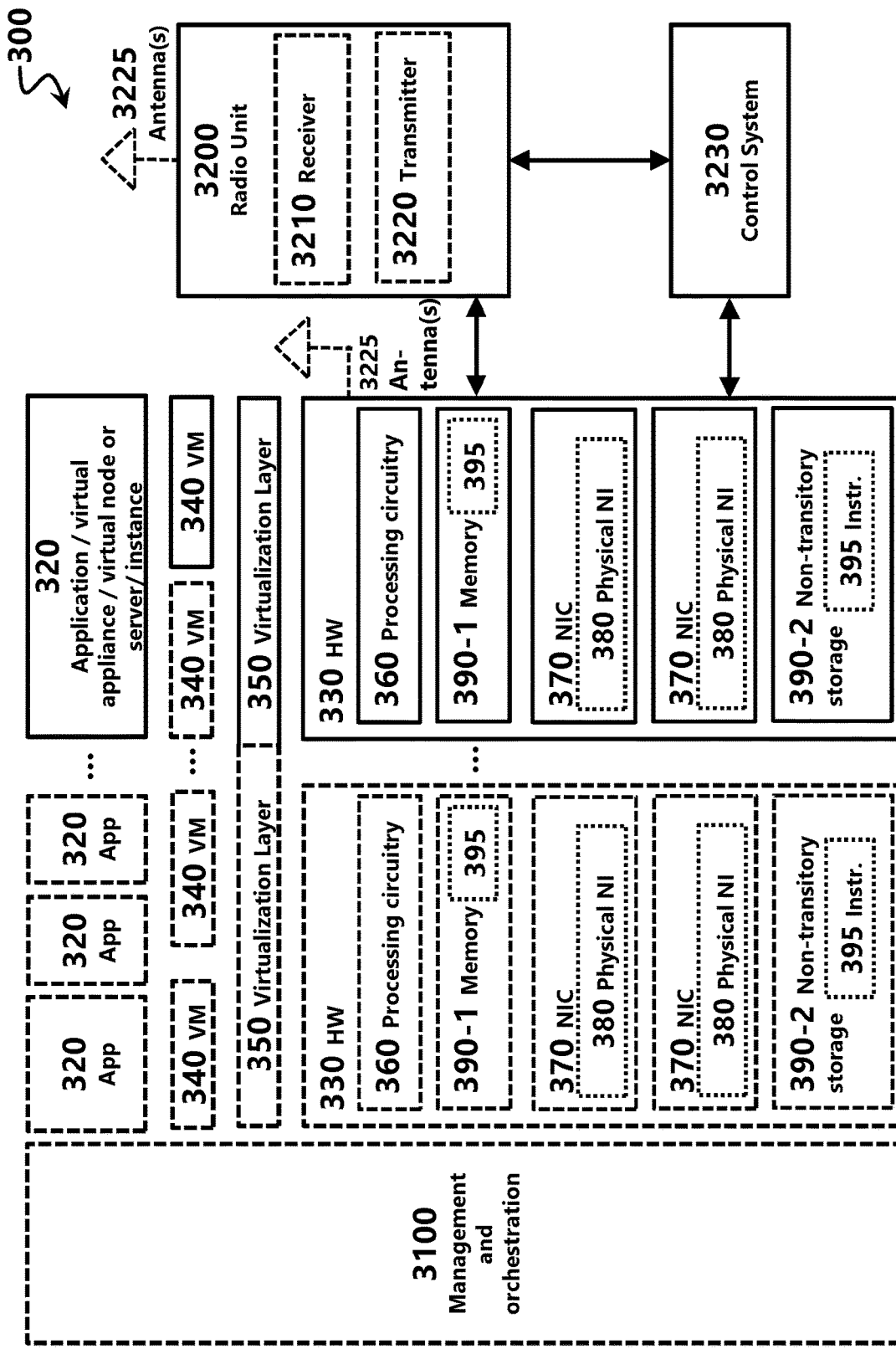
FIG. 3 illustrates an example virtualization environment, in accordance with certain embodiments.

FIG. 3 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 3, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 3.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signalling can be effected with the use of control system 3230 which may alternatively be used for communication between the hardware nodes 330 and radio units 3200.

Figure 4:
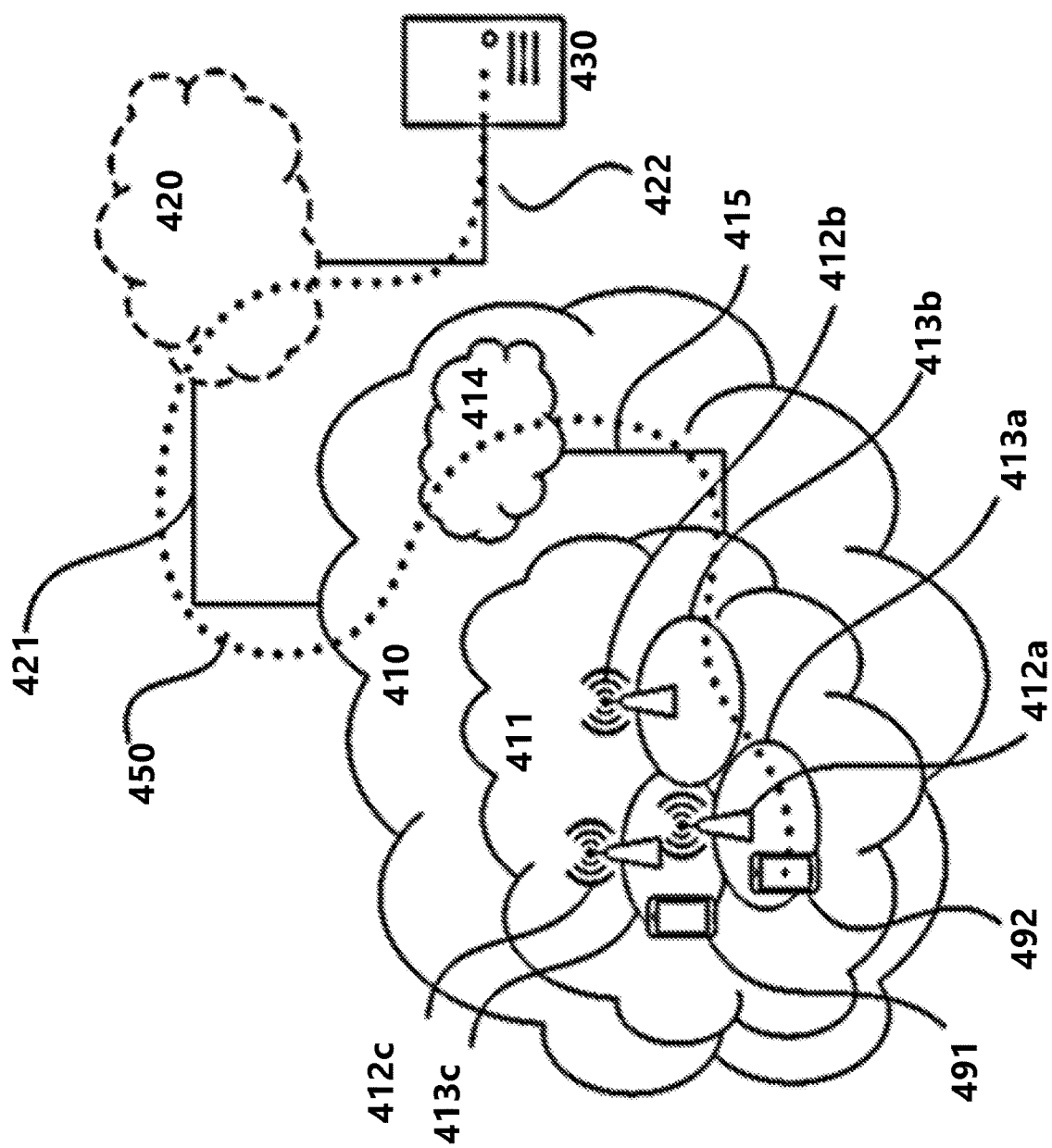
FIG. 4 illustrate an example telecommunication network connected via an intermediate network to a host computer, in accordance with certain embodiments.

With reference to FIG. 4, in accordance with an embodiment, a communication system includes telecommunication network 410, such as a 3GPP-type cellular network, which comprises access network 411, such as a radio access network, and core network 414. Access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider, or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 4 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Example implementations, in accordance with an embodiment, of the UE, base station and host computer discussed in the preceding paragraphs will now be described with reference to FIG. 5. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 5) served by base station 520. Communication interface 526 may be configured to facilitate connection 560 to host computer 510. Connection 560 may be direct or it may pass through a core network (not shown in FIG. 5) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

Figure 5:
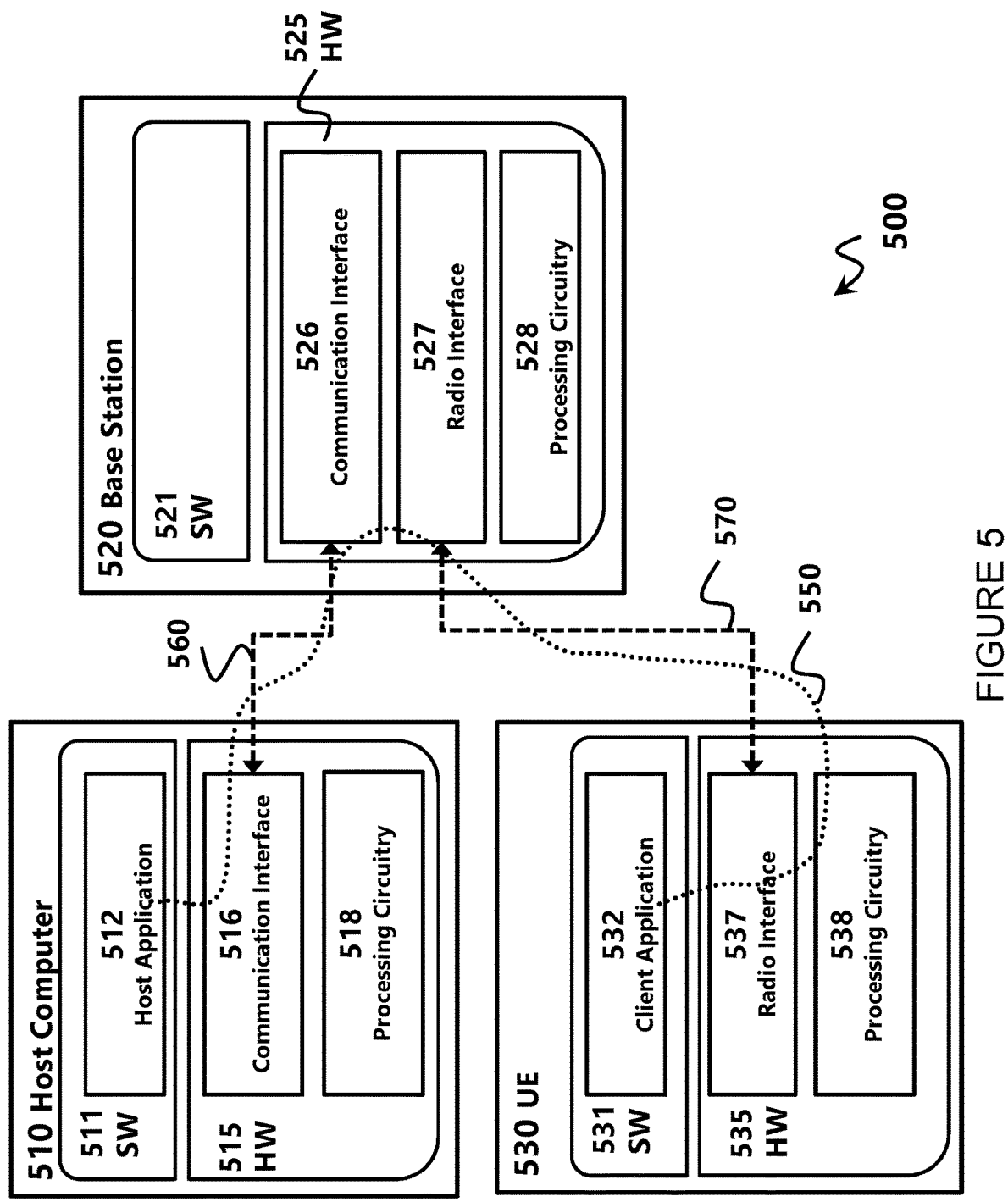
FIG. 5 illustrates an example host computer communicating via a base station with a user equipment over a partially wireless connection, in accordance with certain embodiments.

It is noted that host computer 510, base station 520 and UE 530 illustrated in FIG. 5 may be similar or identical to host computer 430, one of base stations 412*a*, 412*b*, 412*c* and one of UEs 491, 492 of FIG. 4, respectively. This is to say, the inner workings of these entities may be as shown in FIG. 5 and independently, the surrounding network topology may be that of FIG. 4.

In FIG. 5, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve latency and thereby provide benefits such as reduced user waiting time and better responsiveness.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figure 6:
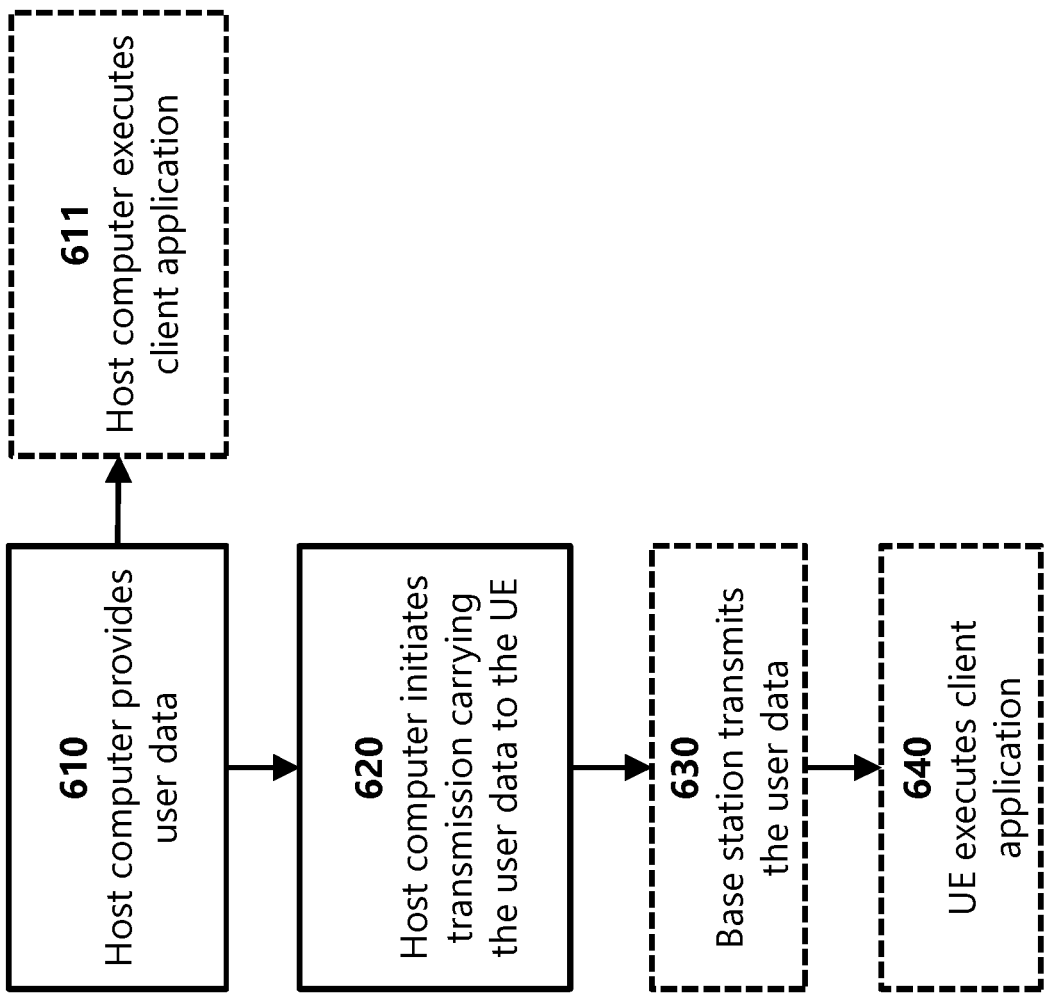
FIG. 6 is a flowchart illustrating an example method implemented in a communication system, in accordance certain embodiments.

FIG. 6 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 6 will be included in this section. In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

Figure 7:
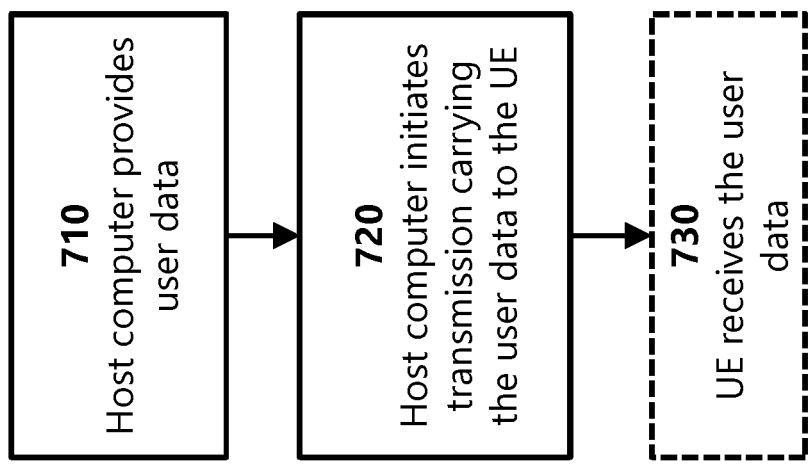
FIG. 7 is a flowchart illustrating a second example method implemented in a communication system, in accordance with certain embodiments.

FIG. 7 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 7 will be included in this section. In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figure 8:
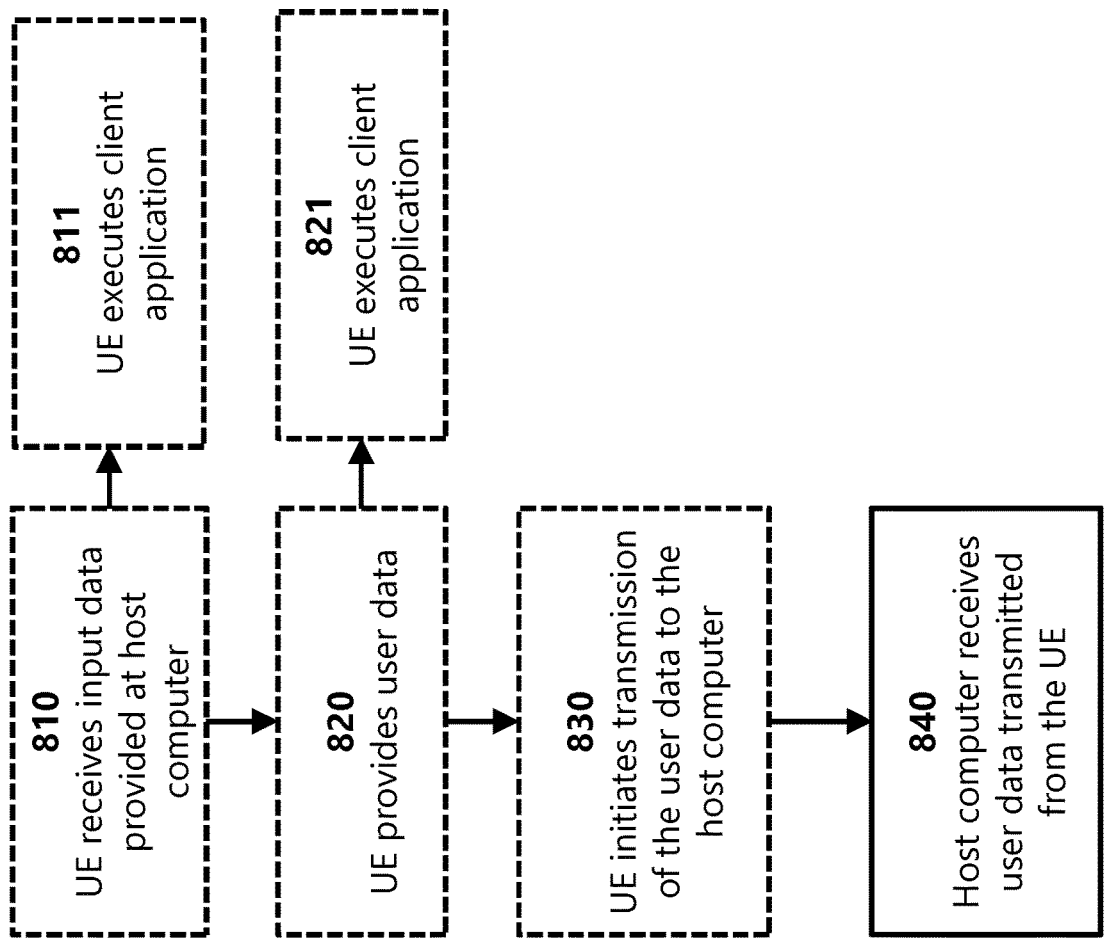
FIG. 8 is a flowchart illustrating a third method implemented in a communication system, in accordance with certain embodiments.

FIG. 8 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 8 will be included in this section. In step 810 (which may be optional), the UE receives input data provided by the host computer. Additionally or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

Figure 9:
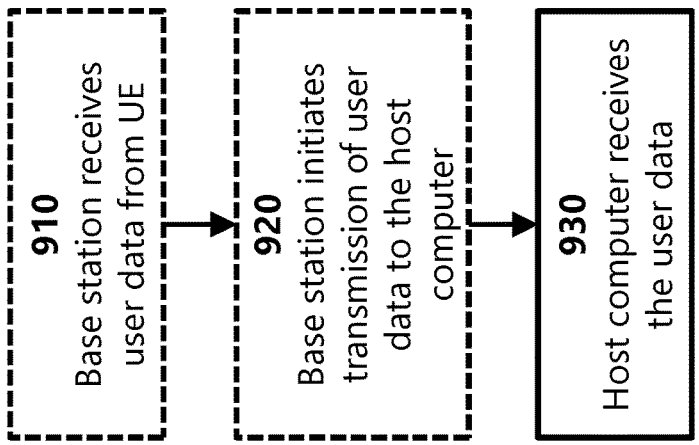
FIG. 9 is a flowchart illustrating a fourth method implemented in a communication system, in accordance with certain embodiments.

FIG. 9 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 9 will be included in this section. In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 10:
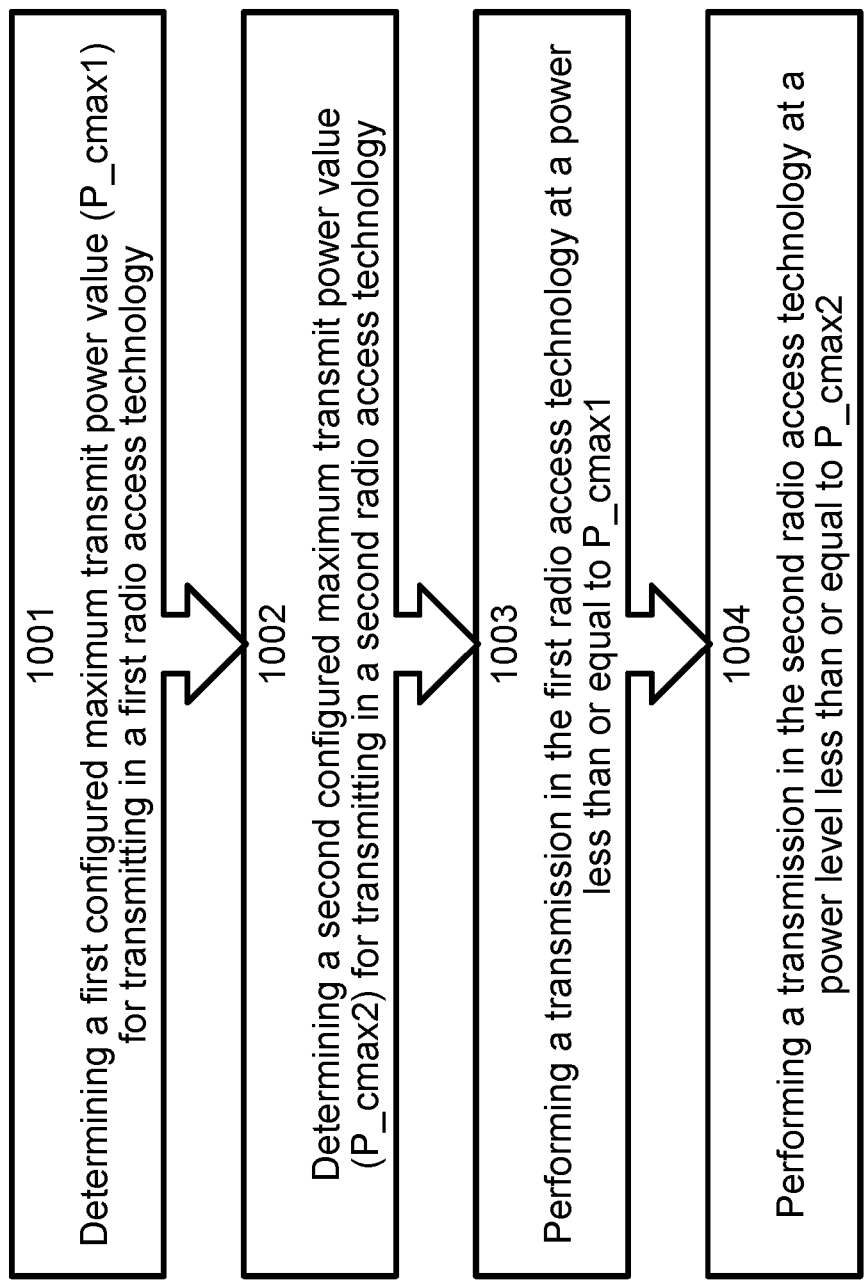
FIG. 10 illustrates an example method performed by a wireless device, in accordance with certain embodiments.

FIG. 10 depicts a method in accordance with particular embodiments, the method begins at step 1001 with determining a first configured maximum transmit power value (P_cmax1) for transmitting in a first radio access technology. The method continues to step 1002 with determining a second configured maximum transmit power value (P_cmax2) for transmitting in a second radio access technology. The method continues to 1003 with performing a transmission in the first radio access technology at a power less than or equal to P_cmax1. The method ends at step 1004 with performing at a transmission in the second radio access technology at a power less than or equal to P_cmax2. Examples of techniques for determining P_cmax1 and P_cmax2 are described in the Group A Embodiments discussed below.

Figure 11:
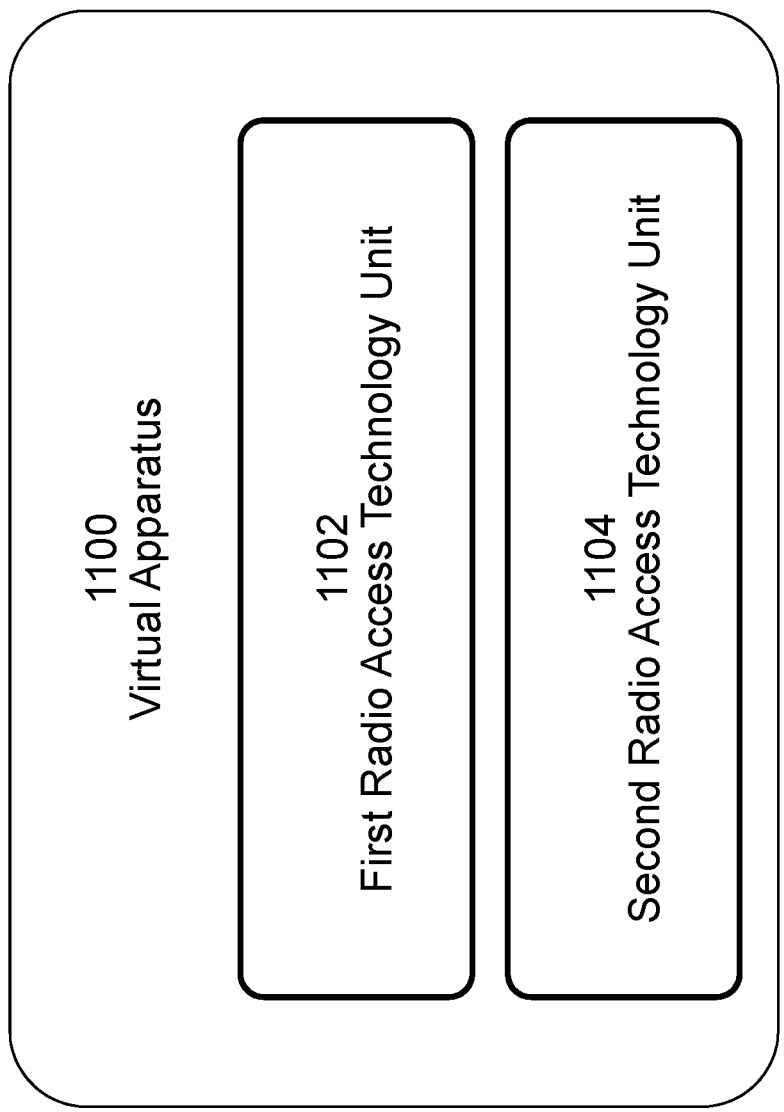
FIG. 11 illustrates a schematic block diagram of a first example apparatus in a wireless network, in accordance with certain embodiments.

FIG. 11 illustrates a schematic block diagram of an apparatus 1100 in a wireless network (for example, the wireless network shown in FIG. 1). The apparatus may be implemented in a wireless device or network node (e.g., wireless device 110 or network node 160 shown in FIG. 1). Apparatus 1100 is operable to carry out the example method described with reference to FIG. 10 and possibly any other processes or methods disclosed herein. It is also to be understood that the method of FIG. 10 is not necessarily carried out solely by apparatus 1100. At least some operations of the method can be performed by one or more other entities.

Virtual Apparatus 1100 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause first radio access technology unit 1102, second radio access technology unit 1104, and any other suitable units of apparatus 1100 to perform corresponding functions according one or more embodiments of the present disclosure.

As illustrated in FIG. 11, apparatus 1100 includes first radio access technology unit 1102 and second radio access technology unit 1104. Each radio access technology unit 1102 and 1104 comprises hardware/software for performing functionality of a respective radio access technology. For example, first radio access technology unit 1102 can be configured to perform steps 1001 and 1003 of FIG. 10, and second radio access technology unit 1104 can be configured to perform steps 1002 and 1004 of FIG. 10. As one example, in certain embodiments, first radio access technology unit 1102 is configured to perform LTE functionality, and second radio access technology unit 1104 is configured to perform NR functionality. In the embodiment, the functionality of first radio access technology unit 1102 includes determining a first configured maximum transmit power value (P_cmax1) for transmitting in LTE and performing an LTE transmission at a power less than or equal to P_cmax1. In the embodiment, the functionality of second radio access technology unit 1104 includes determining a second configured maximum transmit power value (P_cmax2) for transmitting in NR and performing an NR transmission at a power less than or equal to P_cmax2.

Certain embodiments allow a simpler implementation where first radio access technology unit 1102 can operate independently without considering transmissions or configuration settings of second radio access technology unit 1104 (e.g., first radio access technology unit 1102 assumes there is no transmission on the second radio access technology regardless of whether or not second radio access technology unit 1104 is scheduled to transmit on the second radio access technology). Certain embodiments allow second radio access technology unit 1104 to consider transmissions and/or configuration settings of first radio access technology unit 1102, which may help to reduce interference in certain scenarios.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

In some embodiments a computer program, computer program product or computer readable storage medium comprises instructions which when executed on a computer perform any of the embodiments disclosed herein. In further examples the instructions are carried on a signal or carrier and which are executable on a computer wherein when executed perform any of the embodiments disclosed herein.

SAMPLE EMBODIMENTS

Group A Embodiments

1. A method performed by a wireless device for determining a transmit power configuration, the method comprising:
   determining a first configured maximum transmit power value (P_cmax1) for transmitting in a first radio access technology;
   determining a second configured maximum transmit power value (P_cmax2) for transmitting in a second radio access technology;

performing a transmission in the first radio access technology at a power less than or equal to P_cmax1; and performing at a transmission in the second radio access technology at a power less than or equal to P_cmax2.

2. The method of the previous embodiment, wherein performing the transmission in the first radio access node comprises transmitting a physical channel.

3. The method of any of the previous embodiments, wherein performing the transmission in the second radio access node comprises transmitting a physical channel.

4. The method of any of the previous embodiments, wherein the physical channel is a PUCCH, PUSCH, or PRACH.

5. The method of any of the previous embodiments, wherein performing the transmission in the first radio access node comprises transmitting a signal.

6. The method of any of the previous embodiments, wherein performing the transmission in the second radio access node comprises transmitting a signal.

7. The method of any of the previous embodiments, wherein the signal is a sounding reference signal (SRS).

8. The method of any of the previous embodiments, wherein P_cmax1 is determined based on one or more of the following:
a power class value that the wireless device indicates to the network as part of wireless device capability signaling (P_powerclass);
a maximum allowed power value for the first random access technology (P_RAT1);
a first maximum power reduction value (MPR1)
a first backoff value (BO1)

9. The method of any of the previous embodiments, wherein P_cmax2 is determined based on one or more of the following:
P_powerclass
a maximum allowed power value for the second random access technology (P_RAT2)
a second maximum power reduction value (MPR2)
a second backoff value (BO2)
P_cmax1
MPR1
BO1

10. The method of any of the previous embodiments, wherein P_cmax1 is determined based at least in part on MPR1 and/or BO1, and MPR1 and/or BO1 are determined by the wireless device assuming there is no transmission on the second radio access technology regardless of whether the wireless device is scheduled to transmit on the second radio access technology.

11. The method of any of the previous embodiments, wherein P_cmax2 is determined based at least in part on MPR2 and/or BO2, and MPR2 and/or BO2 are determined by the wireless device by considering transmissions scheduled for both the first radio technology and the second radio access technology.

12. The method of any embodiments 1-10, wherein P_cmax2 is determined based at least in part on:
a. at least one of MPR2 and/or BO2, and
b. at least one of MPR1, BO1, and/or P_cmax;
wherein MPR2 and/or BO2 are determined by the wireless device assuming there is no transmission on the first radio access technology regardless of whether the wireless device is scheduled to transmit on the first radio technology.

13. The method of any embodiments 1-10, wherein P_cmax2 is determined based at least in part on the transmission power of ongoing transmission(s) on the first radio access technology.

14. The method of any embodiments 1-10, wherein P_cmax2 is lower than P_RAT2 and P-cmax2 is lower than P_cmax1.

15. The method of any of the previous embodiments, wherein the first radio access technology is Long Term Evolution (LTE) and the second radio access technology is New Radio (NR).

16. The method of any of the previous embodiments, wherein determining P_cmax1 comprises determining a lower bound and an upper bound for P_cmax1 and using a value that is within these bounds.

17. The method of any of the previous embodiments, wherein determining P_cmax2 comprises determining a lower bound and an upper bound for P_cmax2 and using a value that is within these bounds.

18. The method of any of the previous embodiments, wherein the transmission performed in the first radio access technology and the transmission performed in the second radio access technology are both bounded by P_cmax2.

19. The method of any of the previous embodiments, wherein MPR1 is based on number and position of resource blocks allocated for transmissions corresponding only to the LTE radio access technology.

20. The method of any of the previous embodiments, wherein MPR2 is based on number and position of resource blocks allocated for transmissions corresponding to the NR radio access technology and also based on number and position of resource blocks allocated for transmissions corresponding to the LTE radio access technology.

21. The method of any of embodiments 1-19, wherein MPR2 is based on number and position of resource blocks allocated for transmissions corresponding only to the NR radio access technology.

22. The method of any of the previous embodiments, further comprising:
determining a first configured maximum transmit power value per carrier (P_cmax1,c) for transmitting in a respective carrier of the first radio access technology;
performing a transmission in a carrier of the first radio access technology at a power less than or equal to the respective P_cmax1,c.

23. The method of the previous embodiment, wherein P_cmax1 is:
greater than or equal to P_cmax_L, wherein P_cmax_L equals MIN {10 log 10ΣMIN[pEMAX,c, pPowerClass/(x-mpr,c)], PPowerClass}; and
less than or equal to P_cmax_H, wherein P_cmax_H equals MIN{10 log 10ΣpEMAX,c, PPowerClass}.

24. The method of any of the previous embodiments, further comprising:
determining a second configured maximum transmit power value per carrier (P_cmax2,c) for transmitting in a respective carrier of the second radio access technology;
performing a transmission in a carrier of the second radio access technology at a power less than or equal to the respective P_cmax2,c.

25. The method of any of the previous embodiments, further comprising:
providing user data; and forwarding the user data to a host computer via the transmission to the base station.

Group B Embodiments

26. A method performed by a base station, the method comprising:
 determining a configuration for an indicator that indicates whether, when a wireless device is determining a first configured maximum transmit power value (P_cmax1) for a first radio access technology, the wireless device is to consider transmissions scheduled for both the first radio access technology and a second radio access technology.
 sending the indicator to the wireless device.
27. A method performed by a base station, the method comprising:
 sending information to a wireless device from which the wireless derives a first configured maximum transmit power value (P_cmax1) for transmitting in a first radio access technology and a second configured maximum transmit power value (P_cmax2) for transmitting in a second radio access technology.
28. The method of any of the previous embodiments, further comprising:
 obtaining user data; and
 forwarding the user data to a host computer or a wireless device.

Group C Embodiments

29. A wireless device for performing transmissions, the wireless device comprising:
 processing circuitry configured to perform any of the steps of any of the Group A embodiments; and
 power supply circuitry configured to supply power to the wireless device.
30. A base station, the base station comprising:
 processing circuitry configured to perform any of the steps of any of the Group B embodiments;
 power supply circuitry configured to supply power to the wireless device.
31. A user equipment (UE) for performing transmissions, the UE comprising:
 an antenna configured to send and receive wireless signals;
 radio front-end circuitry connected to the antenna and to processing circuitry, and configured to condition signals communicated between the antenna and the processing circuitry;
 the processing circuitry being configured to perform any of the steps of any of the Group A embodiments;
 an input interface connected to the processing circuitry and configured to allow input of information into the UE to be processed by the processing circuitry;
 an output interface connected to the processing circuitry and configured to output information from the UE that has been processed by the processing circuitry; and
 a battery connected to the processing circuitry and configured to supply power to the UE.
32. A communication system including a host computer comprising:
 processing circuitry configured to provide user data; and
 a communication interface configured to forward the user data to a cellular network for transmission to a user equipment (UE),
 wherein the cellular network comprises a base station having a radio interface and processing circuitry, the base station's processing circuitry configured to perform any of the steps of any of the Group B embodiments.
33. The communication system of the pervious embodiment further including the base station.
34. The communication system of the previous 2 embodiments, further including the UE, wherein the UE is configured to communicate with the base station.
35. The communication system of the previous 3 embodiments, wherein:
 the processing circuitry of the host computer is configured to execute a host application, thereby providing the user data; and
 the UE comprises processing circuitry configured to execute a client application associated with the host application.
36. A method implemented in a communication system including a host computer, a base station and a user equipment (UE), the method comprising:
 at the host computer, providing user data; and
 at the host computer, initiating a transmission carrying the user data to the UE via a cellular network comprising the base station, wherein the base station performs any of the steps of any of the Group B embodiments.
37. The method of the previous embodiment, further comprising, at the base station, transmitting the user data.
38. The method of the previous 2 embodiments, wherein the user data is provided at the host computer by executing a host application, the method further comprising, at the UE, executing a client application associated with the host application.
39. A user equipment (UE) configured to communicate with a base station, the UE comprising a radio interface and processing circuitry configured to performs the of the previous 3 embodiments.
40. A communication system including a host computer comprising:
 processing circuitry configured to provide user data; and
 a communication interface configured to forward user data to a cellular network for transmission to a user equipment (UE),
 wherein the UE comprises a radio interface and processing circuitry, the UE's components configured to perform any of the steps of any of the Group A embodiments.
41. The communication system of the previous embodiment, wherein the cellular network further includes a base station configured to communicate with the UE.
42. The communication system of the previous 2 embodiments, wherein:
 the processing circuitry of the host computer is configured to execute a host application, thereby providing the user data; and
 the UE's processing circuitry is configured to execute a client application associated with the host application.
43. A method implemented in a communication system including a host computer, a base station and a user equipment (UE), the method comprising:

at the host computer, providing user data; and
at the host computer, initiating a transmission carrying the user data to the UE via a cellular network comprising the base station, wherein the UE performs any of the steps of any of the Group A embodiments.

44. The method of the previous embodiment, further comprising at the UE, receiving the user data from the base station.

45. A communication system including a host computer comprising:
communication interface configured to receive user data originating from a transmission from a user equipment (UE) to a base station,
wherein the UE comprises a radio interface and processing circuitry, the UE's processing circuitry configured to perform any of the steps of any of the Group A embodiments.

46. The communication system of the previous embodiment, further including the UE.

47. The communication system of the previous 2 embodiments, further including the base station, wherein the base station comprises a radio interface configured to communicate with the UE and a communication interface configured to forward to the host computer the user data carried by a transmission from the UE to the base station.

48. The communication system of the previous 3 embodiments, wherein:
the processing circuitry of the host computer is configured to execute a host application; and
the UE's processing circuitry is configured to execute a client application associated with the host application, thereby providing the user data.

49. The communication system of the previous 4 embodiments, wherein:
the processing circuitry of the host computer is configured to execute a host application, thereby providing request data; and
the UE's processing circuitry is configured to execute a client application associated with the host application, thereby providing the user data in response to the request data.

50. A method implemented in a communication system including a host computer, a base station and a user equipment (UE), the method comprising:
at the host computer, receiving user data transmitted to the base station from the UE, wherein the UE performs any of the steps of any of the Group A embodiments.

51. The method of the previous embodiment, further comprising, at the UE, providing the user data to the base station.

52. The method of the previous 2 embodiments, further comprising:
at the UE, executing a client application, thereby providing the user data to be transmitted; and
at the host computer, executing a host application associated with the client application.

53. The method of the previous 3 embodiments, further comprising:
at the UE, executing a client application; and
at the UE, receiving input data to the client application, the input data being provided at the host computer by executing a host application associated with the client application,
wherein the user data to be transmitted is provided by the client application in response to the input data.

54. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.

55. The communication system of the previous embodiment further including the base station.

56. The communication system of the previous 2 embodiments, further including the UE, wherein the UE is configured to communicate with the base station.

57. The communication system of the previous 3 embodiments, wherein:
the processing circuitry of the host computer is configured to execute a host application;
the UE is configured to execute a client application associated with the host application, thereby providing the user data to be received by the host computer.

58. A method implemented in a communication system including a host computer, a base station and a user equipment (UE), the method comprising:
at the host computer, receiving, from the base station, user data originating from a transmission which the base station has received from the UE, wherein the UE performs any of the steps of any of the Group A embodiments.

59. The method of the previous embodiment, further comprising at the base station, receiving the user data from the UE.

60. The method of the previous 2 embodiments, further comprising at the base station, initiating a transmission of the received user data to the host computer.

Figure 12:
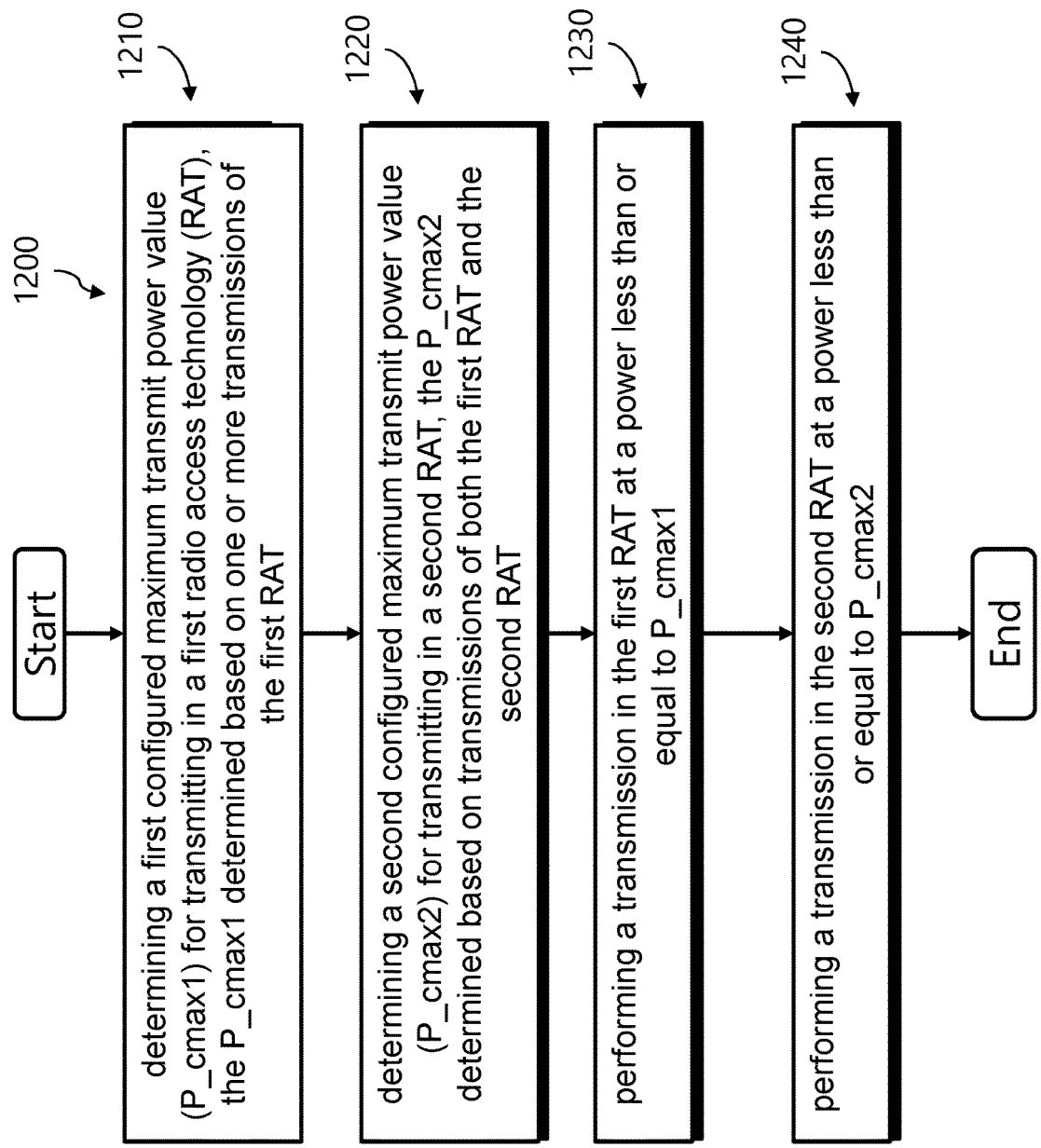
FIG. 12 illustrates a second example method performed by a wireless device, in accordance with certain embodiments.

FIG. 12 illustrates another example method 1200 for use in a wireless device. At step 1210, a first configured maximum transmit power value (P_cmax1) may be determined for transmitting in a first RAT. The P_cmax1 is determined based on one or more transmissions of the first RAT. In some embodiments, P_cmax1 is based on at least a first maximum power reduction value (MPR1), which is determined based on a number of resource blocks allocated for transmissions of the first RAT. In some embodiments, MPR1 is further based on the positions of resources blocks allocated for the transmissions of the first RAT. In some embodiments, MPR1 is based on the numbers and/or positions of resource blocks allocated for transmissions of only the first RAT.

At step 1220, a second configured maximum transmit power value (P_cmax2) may be determined for transmitting in a second RAT. The P_cmax2 is determined based on transmissions of both the first RAT and the second RAT (e.g., at least one transmission of the first RAT and at least one transmission of the second RAT). In certain embodiments, P_cmax2 based on at least a second maximum power reduction value (MPR2), which is determined based on the number of resource blocks allocated for transmissions of both the first RAT and the second RAT (e.g., a number of resource blocks allocated for transmissions of the first RAT and a number of resource blocks allocated for transmissions of the second RAT). In certain embodiments, P_cmax2 is determined based at least in part on the transmission power of current transmissions on the first radio access technology. In some embodiments, MPR2 is further based on the positions of the allocated resource blocks for the first and second RATs.

In certain embodiments, P_cmax1 and P_cmax2 can be determined based on the same, partially the same, or different one or more transmissions of the first RAT. For example, P_cmax1 can be determined based on one or more first transmissions of the first RAT and P_cmax2 can be determined based on one or more second transmissions of the first RAT, wherein the first and second transmission(s) of the first RAT may be the same transmission(s), may include some of the same transmission(s), and/or not contain any same transmission(s). This may be useful in ensuring that the correct transmissions of the first RAT are accounted for in each determination, i.e., in determining P_cmax1 and P_cmax2. In some embodiments, knowledge of only certain transmissions of the first RAT may be available, so the second transmissions may contain only a subset of the first transmissions, or vice versa. In some embodiments, the second transmissions may be relevant only to the wireless device transmitting on the second RAT and the first transmissions relevant to transmitting on the first RAT, e.g., due to interference and/or resource allocation. In this manner, certain embodiments ensure the flexibility of the wireless device to use the necessary information to determine the maximum transmit power values for each respective RAT.

In certain embodiments, P_cmax1 and/or P_cmax2 is determined by considering transmissions scheduled for both the first RAT and the second RAT. Alternatively, in certain embodiments, P_cmax2 is determined based on assuming the first RAT has no scheduled transmissions regardless of whether the wireless device is scheduled to transmit on the first RAT. Similarly, in certain embodiments, P_cmax1 is determined based on assuming the second RAT has no scheduled transmissions regardless of whether the wireless device is scheduled to transmit on the second RAT. In this manner, the determination of P_cmax1 and/or P_cmax2 may be configurable based on the type of RATs it is accessing and the capability of the network to coordinate or obtain information about scheduling of resources across different RATs.

In certain embodiments, determining one or more of P_cmax1 and P_cmax2 includes determining respective lower bounds and upper bounds for P_cmax1 and/or P_cmax2 and using a value with those bounds for P_cmax1 and/or P_cmax2, respectively.

In certain embodiments, the first RAT is LTE RAT and second RAT is New Radio (NR) RAT. In this manner, the wireless device may determine respective maximum powers for multi-RAT configurations, including combinations of LTE and NR RATs.

At step 1230, a transmission is performed in the first RAT at a power less than or equal to P_cmax1. In certain embodiments, performing the transmission of the first RAT comprises transmitting a physical channel or signal of the first RAT. The physical channel or signal of the first RAT may be any one of PUSCH, a PUCCH, a SRS, and a PRACH.

At step 1240, a transmission is performed in the second RAT at a power less than or equal to P_cmax2. In certain embodiments, performing the transmission of the second RAT comprises transmitting a physical channel or signal of the second RAT. The physical channel or signal of the second RAT is one of a PUSCH, a PUCCH, a PRACH, and an SRS.

Accordingly, method 1200 illustrates a method for use in a wireless device, whereby the wireless device determines maximum transmit power values (P_cmax1 and P_cmax2) for respective radio access technologies on which the wireless device may be connected or otherwise transmit on. Further, the wireless device may perform transmissions on the respective radio access technologies using transmit powers less than or equal to the determined P_cmax1 and P_cmax2, respectively. As a result, an example method is provided that addresses one or more of the problems discussed herein and provides one or more of the disclosed advantages over conventional techniques.

In certain embodiments, a network node to which the wireless device is connected may determine a configuration for an indicator. The indicator may indicate whether, when a wireless device is determining a first configured maximum transmit power value (P_cmax1) for a first RAT, the wireless device is to consider transmissions scheduled for both the first RAT and a second RAT. The network node may transmit or otherwise send the indicator to the wireless device. In some embodiments, the network nod further sends information to the wireless device from which the wireless derives the P_cmax1 for transmitting in the first RAT and the P_cmax2 for transmitting in the second RAT. For example, the network node may transmit information that enables the wireless device to derive transmission information on the first and/or second RAT, e.g., what transmissions are scheduled or what transmission are currently being transmitted. In this manner, the network may help configure how the wireless device considers transmissions of the second RAT (e.g., ignoring those transmissions or taking those into account when determining P_cmax1) and help provide information used to derive P_cmax1 and P_cmax2.

Although the present disclosure has been described with several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

The invention claimed is:

1. A method performed by a wireless device, the method comprising:
    determining a first configured maximum transmit power value (P_cmax1) for transmitting in a first radio access technology (RAT), the P_cmax1 determined by the wireless device based on one or more physical channel or physical signal transmissions scheduled for transmission by the wireless device via the first RAT;
    determining a second configured maximum transmit power value (P_cmax2) for transmitting in a second RAT, the P_cmax2 determined by the wireless device based on transmissions of the wireless device via the first RAT in a time duration and one or more physical channel or physical signal transmissions scheduled for transmission by the wireless device via the second RAT in the same time duration;
    transmitting via the first RAT at a power less than or equal to the P_cmax1; and
    transmitting via the second RAT at a power less than or equal to the P_cmax2.

2. The method of claim 1, wherein the P_cmax1 is further based on at least a first maximum power reduction value (MPR1), wherein the MPR1 is determined based on a number of resource blocks allocated for the one or more physical channel or physical signal transmissions scheduled for transmission via the first RAT.

3. The method of claim 1, wherein the P_cmax2 is further based on at least a second maximum power reduction value (MPR2), wherein the MPR2 is determined based on a number of resource blocks allocated for the transmissions of the wireless device via the first RAT in the time duration and the one or more physical channel or physical signal transmissions scheduled for transmission via the second RAT in the same time duration.

4. The method of claim 1, wherein the P_cmax2 is determined based at least in part on a transmission power of the transmissions on the first RAT in the time duration.

5. The method of claim 1, wherein:
the one or more physical channel or physical signal transmissions scheduled for transmission by the wireless device via the first RAT are one of a Physical Uplink Shared Channel (PUSCH), a Physical Uplink Control Channel (PUCCH), a Sounding Reference Signal (SRS), and a Physical Random Access Channel (PRACH) of the first RAT; and
the one or more physical channel or physical signal transmissions scheduled for transmission by the wireless device via the second RAT are one of a PUSCH, a PUCCH, an SRS, or a PRACH of the second RAT.

6. The method of claim 1, wherein the P_cmax1 is determined based on one or more of the following:
a power class value that the wireless device indicates to the network as part of wireless device capability signaling (P_powerclass);
a maximum allowed power value for the first radio access technology (P_RAT1);
a first maximum power reduction value (MPR1); and/or
a first backoff value (BO1).

7. The method of claim 6, wherein the P_cmax2 is determined based on one or more of the following:
the P_powerclass;
a maximum allowed power value for the second radio access technology (P_RAT2);
a second maximum power reduction value (MPR2);
a second backoff value (BO2);
the P_cmax1;
the MPR1; and/or
the BO1.

8. The method of claim 7, wherein the P_cmax2 is determined based at least in part on the MPR2 and/or the BO2, and the MPR2 and/or the BO2 are determined by the wireless device by considering the transmissions of the wireless device via the first RAT in the time duration and the one or more physical channel or physical signal transmissions scheduled for transmission by the wireless device via the second RAT in the same time duration.

9. The method of claim 6, wherein the P_cmax1 is determined based at least in part on the MPR1 and/or the BO1, and the MPR1 and/or the BO1 are determined by the wireless device based on the second RAT having no scheduled transmissions regardless of whether the wireless device is scheduled to transmit on the second RAT.

10. The method of claim 1, wherein the powers for transmitting via the first RAT and for transmitting via the second RAT are both bounded based on the P_cmax2.

11. The method of claim 1, wherein the P_cmax1 is further based on at least a first maximum power reduction value (MPR1), wherein the MPR1 is determined based on a number of resource blocks and positions of the resource blocks allocated for the one or more physical channel or physical signal transmissions scheduled for transmission via the first RAT.

12. The method of claim 1, wherein the P_cmax2 is further based on at least a second maximum power reduction value (MPR2), wherein the MPR2 is determined based on a number of resource blocks and positions of the resource blocks allocated for the transmissions of the first RAT in the time duration and the one or more physical channel or physical signal transmissions scheduled for transmission via the second RAT in the same time duration.

13. A wireless device comprising:
a memory configured to store instructions; and
processing circuitry configured to execute the instructions; wherein the wireless device is configured to:
determine a first configured maximum transmit power value (P_cmax1) for transmitting in a first radio access technology (RAT), the P_cmax1 determined by the wireless device based on one or more physical channel or physical signal transmissions scheduled for transmission by the wireless device via the first RAT;
determine a second configured maximum transmit power value (P_cmax2) for transmitting in a second RAT, the P_cmax2 determined by the wireless device based on transmissions of the wireless device via the first RAT in a time duration and one or more physical channel or physical signal transmissions scheduled for transmission by the wireless device via the second RAT in the same time duration;
transmit via the first RAT at a power less than or equal to the P_cmax1; and
transmit via the second RAT at a power less than or equal to the P_cmax2.

14. The wireless device of claim 13, wherein the P_cmax1 is further based on at least a first maximum power reduction value (MPR1), wherein the MPR1 is determined based on a number of resource blocks allocated for the one or more physical channel or physical signal transmissions scheduled for transmission via the first RAT.

15. The wireless device of claim 13, wherein the P_cmax2 is further based on at least a second maximum power reduction value (MPR2), wherein MPR2 is determined based on the number of resource blocks allocated for the transmissions of the wireless device via the first RAT in the time duration and the one or more physical channel or physical signal transmissions scheduled for transmission via the second RAT in the same time duration.

16. The wireless device of claim 13, wherein the P_cmax2 is determined based at least in part on a transmission power of the transmissions on the first RAT in the time duration.

17. The wireless device of claim 13, wherein:
the one or more physical channel or physical signal transmissions scheduled for transmission by the wireless device via the first RAT are one of a Physical Uplink Shared Channel (PUSCH), a Physical Uplink Control Channel (PUCCH), a Sounding Reference Signal (SRS), and a Physical Random Access Channel (PRACH) of the first RAT; and
the one or more physical channel or physical signal transmissions scheduled for transmission by the wireless device via the second RAT are one of a PUSCH, a PUCCH, an SRS, or a PRACH of the second RAT.

18. The wireless device of claim 13, wherein the P_cmax1 is determined based on one or more of the following:
a power class value that the wireless device indicates to the network as part of wireless device capability signaling (P_powerclass);
a maximum allowed power value for the first radio access technology (P_RAT1);
a first maximum power reduction value (MPR1); and/or
a first backoff value (BO1).

19. The wireless device of claim 18, wherein the P_cmax2 is determined based on one or more of the following:
the P_powerclass;

a maximum allowed power value for the second radio access technology (P_RAT2);
a second maximum power reduction value (MPR2);
a second backoff value (BO2);
the P_cmax1;
the MPR1; and/or
the BO1.

20. The wireless device of claim 18, wherein the P_cmax1 is determined based at least in part on the MPR1 and/or the BO1, and the MPR1 and/or the BO1 are determined by the wireless device based on the second RAT having no scheduled transmissions regardless of whether the wireless device is scheduled to transmit on the second RAT.

21. The wireless device of claim 19, wherein the P_cmax2 is determined based at least in part on the MPR2 and/or the BO2, and the MPR2 and/or the BO2 are determined by the wireless device by considering the transmissions of the wireless device via the first RAT in the time duration and the one or more physical channel or physical signal transmissions scheduled for transmission by the wireless device via the second RAT in the same time duration.

22. The wireless device of claim 13, wherein the powers for transmitting via the first RAT and for transmitting via the second RAT are both bounded based on the P_cmax2.

23. The wireless device of claim 13, wherein the P_cmax1 is further based on at least a first maximum power reduction value (MPR1), wherein the MPR1 is determined based on a number of resource blocks and positions of the resource blocks allocated for the one or more physical channel or physical signal transmissions scheduled for transmission via the first RAT.

24. The wireless device of claim 13, wherein the P_cmax2 is further based on at least a second maximum power reduction value (MPR2), wherein the MPR2 is determined based on a number of resource blocks and positions of the resource blocks allocated for the transmissions of the first RAT in the time duration and the one or more physical channel or physical signal transmissions scheduled for transmission via the second RAT in the same time duration.

25. The wireless device of claim 13, wherein the wireless device is further configured to determine the P_cmax1 without considering transmissions of the wireless device via the second RAT.

26. The wireless device of claim 13, wherein the transmissions of the wireless device via the first RAT in the time duration that the P_cmax2 is determined based on are the same as the one or more physical channel or physical signal transmissions scheduled for transmission by the wireless device via the first RAT that the P_cmax1 is determined based on.

27. The wireless device of claim 13, wherein:
to determine the P_cmax1 comprises the wireless device configured to determine a lower bound for P_cmax1 and an upper bound for P_cmax1, and to use a value within the lower bound for P_cmax1 and the upper bound for P_cmax1; and
to determine the P_cmax2 comprises the wireless device configured to determine a lower bound for P_cmax2 and an upper bound for P_cmax2, and to use a value within the lower bound for P_cmax2 and the upper bound for P_cmax2.

28. A computer program product comprising a non-transitory computer readable medium storing computer readable program code, the computer readable program code comprises:
program code for determining a first configured maximum transmit power value (P_cmax1) for transmitting in a first radio access technology (RAT), the P_cmax1 determined by a wireless device based on one or more physical channel or physical signal transmissions scheduled for transmission by the wireless device via the first RAT;
program code for determining a second configured maximum transmit power value (P_cmax2) for transmitting in a second RAT, the P_cmax2 determined by the wireless device based on transmissions of the wireless device via the first RAT in a time duration and one or more physical channel or physical signal transmissions scheduled for transmission by the wireless device via the second RAT in the same time duration;
program code for transmitting via the first RAT at a power less than or equal to the P_cmax1; and
program code for transmitting via the second RAT at a power less than or equal to the P_cmax2.

* * * * *